US010451506B2

United States Patent
Kobayashi et al.

(10) Patent No.: US 10,451,506 B2
(45) Date of Patent: Oct. 22, 2019

(54) DIAPHRAGM, PRESSURE SENSOR USING DIAPHRAGM, AND DIAPHRAGM PRODUCING METHOD

(71) Applicant: Seiko Instruments Inc., Chiba-shi, Chiba (JP)

(72) Inventors: Tomoo Kobayashi, Chiba (JP); Ryo Sugawara, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 183 days.

(21) Appl. No.: 15/678,416

(22) Filed: Aug. 16, 2017

(65) Prior Publication Data
US 2018/0149535 A1    May 31, 2018

(30) Foreign Application Priority Data

Nov. 29, 2016   (JP) .................................. 2016-230759

(51) Int. Cl.
*G01L 9/00*   (2006.01)
*G01L 7/08*   (2006.01)
*B23K 20/02*  (2006.01)

(52) U.S. Cl.
CPC ............ *G01L 7/082* (2013.01); *B23K 20/023* (2013.01); *G01L 9/0044* (2013.01); *G01L 9/0055* (2013.01)

(58) Field of Classification Search
CPC .......... B23K 20/023; G01L 7/00; G01L 7/08; G01L 7/082; G01L 9/00–14; G01L 9/0044; G01L 9/0055
See application file for complete search history.

(56) References Cited

U.S. PATENT DOCUMENTS

| 6,189,205 B1* | 2/2001 | Molkner ............... G01L 9/0051 29/620 |
| 6,291,806 B1* | 9/2001 | Quick .................. B01D 29/012 219/633 |
| 6,490,932 B1* | 12/2002 | Naegele ............... G01L 9/0044 73/715 |
| 2015/0078953 A1* | 3/2015 | Otomo .................... C22C 38/00 420/67 |

FOREIGN PATENT DOCUMENTS

| EP | 2759607 A1 | 7/2014 |
| EP | 2998056 A1 | 3/2016 |
| JP | H09031577 A | 2/1997 |
| JP | 2011-164072 A | 8/2011 |

OTHER PUBLICATIONS

Extended European Search Report in European Application No. 17183825.3, dated Mar. 9, 2018, pp. 1-12.
Extended European Search Report in European Application No. 19152399.2, dated Jun. 3, 2019 (7 pages).
Summons to attend oral proceedings pursuant to Rule 115(1) EPC issued from the European Patent Office in European Application No. 17183825.3 on Jun. 12, 2019 (6 pages).

* cited by examiner

*Primary Examiner* — Nguyen Q. Ha
(74) *Attorney, Agent, or Firm* — Brinks Gilson & Lione (57) ABSTRACT

Provided herein is a diaphragm that is highly durable, and that does not involve the risk of gas leakage, and a pressure sensor using such a diaphragm. The diaphragm is a metallic diaphragm that includes a plate-shaped pressure receiver, and a frame-like support member. The pressure receiver has a metal structure grown parallel to a flat plate surface of the plate-shaped pressure receiver.

9 Claims, 6 Drawing Sheets

PRIOR ART

PRIOR ART

PRIOR ART

PRIOR ART

Fig. 6D

DIAPHRAGM, PRESSURE SENSOR USING DIAPHRAGM, AND DIAPHRAGM PRODUCING METHOD

RELATED APPLICATIONS

This application claims priority under 35 U.S.C. § 119 to Japanese Patent Application No. 2016-230759 filed on Nov. 29, 2016, the entire content of which is hereby incorporated by reference.

BACKGROUND OF THE INVENTION

1. Field of the Invention

The present invention relates to a diaphragm, a pressure sensor using a diaphragm, and a diaphragm producing method.

2. Description of Related Art

For pressure measurement of fluids such as liquids and gases, a pressure sensor is used in a wide range of fields including semiconductor manufacturing apparatuses, medical equipment, automobiles, and food. A pressure sensor used for such applications include a cap member provided with a conduit for introducing a measurement target fluid, and a diaphragm that is integral with the cap member.

The diaphragm is configured from a thick-walled, cylindrical support member, and a thin-walled pressure receiver closing the upper aperture of the cylindrical support member, and that makes contact with the measurement target fluid. On the bottom side of the diaphragm is a pressure chamber, depressed in shape, for accepting the measurement target. A reference pressure chamber that accepts a reference gas is formed in the space partitioned by the diaphragm and the cap member.

With the measurement target gas introduced into the pressure chamber, and the reference gas introduced into the reference pressure chamber, the pressure receiver of the diaphragm deforms under the pressure difference between the pressure chamber and the reference pressure chamber. A bridge circuit is provided on the top surface of the diaphragm, or the surface of the pressure receiver opposite the pressure chamber. For pressure measurement, a measurement circuit measures a resistive change in the strain gauge of the bridge circuit provided for the pressure receiver that undergoes deformation according to the relative pressure of the pressure chamber and the reference pressure chamber.

The diaphragm used for such pressure sensors is required to have corrosion resistance against a wide range of highly corrosive fluids, and, at the same time, desirable levels of mechanical strength sufficient to withstand repeated deformation. Various types of stainless steels, Co-base alloys, and other such metallic materials are used as material of a diaphragm having such properties (see, for example, JP-A-2011-164072).

The diaphragm of a shape having a cylindrical support member, and a pressure receiver formed on the upper portion of the support member can be produced from an ingot obtained by melting. The ingot is drawn into a round rod shape, and sliced into a disc shape. The disc can then be cut, and polished to form an integral unit of the pressure receiver and the support member.

The pressure receiver of the metallic diaphragm of such a shape is thin, and may allow passage of gas when, for example, fine pores (cracks) occur under the strain or other forces exerted during working. If used for a pressure sensor, such a diaphragm fails to produce an accurate relative pressure between the pressure chamber and the reference pressure chamber, with the result that the pressure reading becomes inaccurate.

SUMMARY OF THE INVENTION

It is accordingly an object of the present invention to provide a diaphragm that is highly durable, and that does not involve the risk of gas leakage, and a pressure sensor using such a diaphragm.

A diaphragm of an aspect of the present invention is a metallic diaphragm that includes a plate-shaped pressure receiver, and a frame-like support member, wherein the pressure receiver has a metal structure grown parallel to a flat plate surface of the plate-shaped pressure receiver.

According to the aspect of the present invention, the metal structure in the pressure receiver of the diaphragm is parallel to the flat plate surface, and pore generation through the pressure receiver can be reduced. In this way, gas leakage in the pressure receiver can be prevented, and a diaphragm with excellent durability can be provided.

In the diaphragm of the aspect of the present invention, the pressure receiver may be bonded to an end surface of the support member.

According to the aspect of the present invention, the diaphragm has a structure in which the plate having reduced generation of vertically penetrating pores is welded to the support member. In this way, gas leakage in the pressure receiver can be prevented, and a diaphragm with excellent durability can be provided. Additionally, by using the plate that can be more easily finished (for example, by polishing) than a diaphragm of a depressed shape, the pressure receiver can have excellent flatness and surface smoothness, and the pressure measurement accuracy of the diaphragm can improve.

In the diaphragm of the aspect of the present invention, the pressure receiver and the support member may be integrally formed.

According to the aspect of the present invention, the pressure receiver and the support member of the diaphragm are integrally formed, and there is no joint such as by welding. This makes it possible to reduce lowering of mechanical strength or corrosion resistance due to a bonding failure, and the diaphragm can have excellent durability.

In the diaphragm of the aspect of the present invention, the pressure receiver may comprise a Co—Ni-base alloy of a composition containing, in mass %, Co: 28 to 42%, Ni: 15 to 40%, Cr: 10 to 27%, Mo: 3 to 12%, Ti: 0.1 to 1%, Mn: 1.5% or less, Fe: 0.1 to 26%, C: 0.1% or less, Nb: 3% or less, W: 5% or less, Al: 0.5% or less, and the balance unavoidable impurities.

According to the aspect of the present invention, a Co—Ni-base alloy having desirable corrosion resistance and desirable durability against a halogen corrosive gas is used for the pressure receiver, and the diaphragm can provide a pressure sensor suited for pressure measurement of a corrosiveness fluid, in addition to the foregoing effects.

In the diaphragm of the aspect of the present invention, the pressure receiver may comprise a duplex stainless steel of a composition range containing, in mass %, Cr: 24 to 26%, Mo: 2.5 to 3.5%, Ni: 5.5 to 7.5%, C: 0.03% or less, N: 0.08 to 0.3%, and the balance Fe and unavoidable impurities.

According to the aspect of the present invention, a duplex stainless steel having excellent electrochemical corrosion resistance against anode corrosion is used for the pressure receiver. In this way, sufficient corrosion resistance can be provided even in an anode corrosive environment where a potential difference occurs between the pressure sensor using the diaphragm, and a pipe having the pressure sensor incorporated therein, in addition to the foregoing effects.

A pressure sensor of an aspect of the present invention uses the diaphragm of the foregoing characteristics.

In this way, the pressure sensor can have excellent durability.

A diaphragm producing method of an aspect of the present invention is a method for producing a metallic diaphragm that includes a plate-shaped pressure receiver, and a frame-like support member, the method including:

flattening a raw material alloy ingot, and punching the worked plate with a forming press to produce the pressure receiver having a metal structure grown parallel to a flat plate surface of the plate; and bonding the pressure receiver to an end surface of the support member.

According to the aspect of the present invention, a plate with reduced generation of vertically penetrating pores is produced, and bonded to a support member. In this way, gas leakage in the pressure receiver can be prevented, and a diaphragm having excellent durability can be produced. Additionally, by using the plate that can be more easily finished (for example, by polishing) than a diaphragm of a depressed shape, the pressure receiver can have excellent flatness and surface smoothness, and the pressure measurement accuracy of the diaphragm can improve.

In the diaphragm producing method of the aspect of the present invention, the pressure receiver and the end surface of the support member may be bonded to each other by diffusion bonding.

According to the aspect of the present invention, the pressure receiver and the support member can be bonded to each other at low temperature. In this way, a diaphragm can be produced that is sufficiently strong, and can maintain corrosion resistance even when the pressure receiver and the support member, which are separate members, are combined.

A diaphragm producing method of an aspect of the present invention is a method for producing a metallic diaphragm that includes a plate-shaped pressure receiver, and a frame-like support member, the method including:

cold working a raw material alloy ingot into a rod shape to produce a rod body having a metal structure extending along the working direction;

cutting the rod body into a desired size to obtain a block unit, and machining the block unit to integrally form the pressure receiver and the support member in such an orientation that the growth direction of the metal structure is parallel to a flat plate surface of the plate-shaped pressure receiver.

According to the aspect of the present invention, generation of vertically penetrating pores through the pressure receiver can be reduced while allowing the pressure receiver and the support member to be integrally formed. In this way, gas leakage in the pressure receiver can be prevented, and a diaphragm having excellent durability can be reliably produced.

In the diaphragm producing method of the aspect of the present invention, the pressure receiver may comprise a Co—Ni-base alloy of a composition range containing, in mass %, Co: 28 to 42%, Ni: 15 to 40%, Cr: 10 to 27%, Mo: 3 to 12%, Ti: 0.1 to 1%, Mn: 1.5% or less, Fe: 0.1 to 26%, C: 0.1% or less, Nb: 3% or less, W: 5% or less, Al: 0.5% or less, and the balance unavoidable impurities.

According to the aspect of the present invention, a Co—Ni-base alloy having desirable corrosion resistance and desirable durability against a halogen corrosive gas is used for the pressure receiver, and the diaphragm can provide a pressure sensor suited for pressure measurement of a corrosiveness fluid, in addition to the foregoing effects.

In the diaphragm producing method of the aspect of the present invention, the pressure receiver may comprise a duplex stainless steel of a composition range containing, in mass %, Cr: 24 to 26%, Mo: 2.5 to 3.5%, Ni: 5.5 to 7.5%, C: 0.03% or less, N: 0.08 to 0.3%, and the balance Fe and unavoidable impurities.

According to the aspect of the present invention, a diaphragm having anode corrosion resistance can be provided, in addition to the foregoing effects.

The present invention has enabled producing a diaphragm that is highly durable, and that does not involve the risk of gas leakage, and a pressure sensor using such a diaphragm.

DETAILED DESCRIPTION OF THE PREFERRED EMBODIMENTS

Embodiments of the diaphragm of the present invention are described below in detail with respect to the configuration of the diaphragm, with reference to the accompanying drawings.

Overview of Diaphragm and Pressure Sensor

Figure 1:
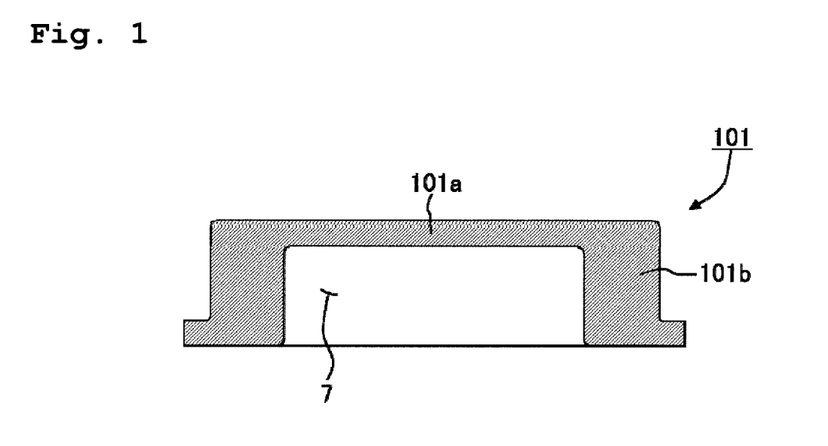
FIG. 1 is a schematic cross sectional view representing a diaphragm according to the present invention.

FIG. 1 is a schematic cross sectional view of a diaphragm of an embodiment of the present invention.

As illustrated in FIG. 1, a diaphragm 101 includes a thick-walled, cylindrical support member 101b, and a thin-walled pressure receiver 101a provided so as to close the upper aperture of the cylindrical support member 101b. On the bottom side of the diaphragm 101 is a depressed pressure chamber 7 for accepting a measurement target fluid.

Figure 2:
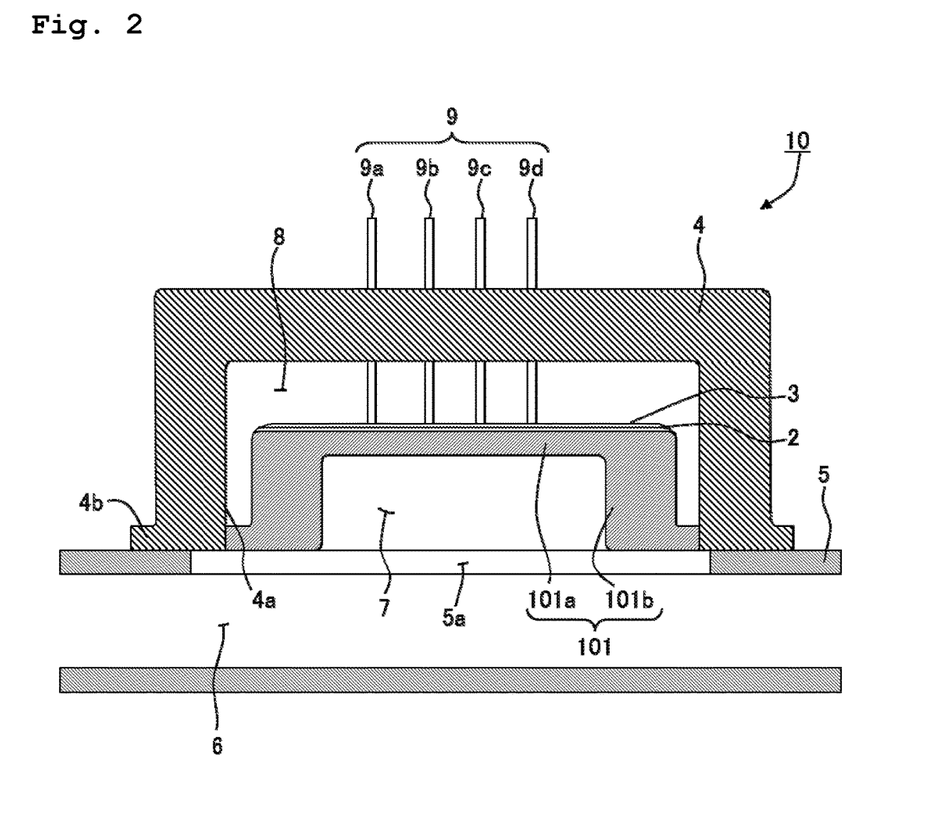
FIG. 2 is a schematic cross sectional view representing an example of a pressure sensor provided with the diaphragm according to the present invention.

As illustrated in FIG. 2, a pressure sensor 10 of an embodiment of the present invention includes a cap member 4 that includes a measurement target fluid, and the diaphragm 101 integrally provided with the cap member 4 by being bonded thereto. The cap member 4 has a form of a closed-end cylinder with an opening 4a, and has a flange portion 4b on the outer circumference of the opening 4a. The cap member 4 is bonded to the peripheral portion of the diaphragm 101 at the inner circumference of the opening 4a. The cap member 4 is formed of a material, for example, such as a metal, an alloy, and a composite material of an alloy and a resin mold. Inside the cap member 4 is a reference pressure chamber 8 partitioned by the cap member 4 and the diaphragm 101. The cap member 4 has an inlet (not illustrated) for a reference gas. The reference gas is introduced into the reference pressure chamber 8 to control the pressure inside the reference pressure chamber 8.

Upon installing the pressure sensor 10 by attaching the opening side of the cap member 4 from the opposite side around an opening 5a formed through the peripheral wall of a pipe 5 forming a measurement target fluid channel 6 as shown in FIG. 2, the pressure chamber 7 becomes in communication with the channel 6, and the fluid introduced through the channel 6 fills the pressure chamber 7. This brings the pressure receiver 101a in direct contact with the measurement target fluid.

A bridge circuit 3 is provided on the surface of the pressure receiver 101a opposite the pressure chamber 7, specifically, on the top surface side of the diaphragm 101, via an insulating film 2 such as a silicon oxide film. The bridge circuit 3 is configured from four strain gauges (not illustrated), which are connected to connector wires 9, for example, wires 9a, 9b, 9c, and 9d.

With a reference gas and the like introduced into the reference pressure chamber 8, and the measurement target fluid introduced into the pressure chamber 7 through the pipe 5, the pressure receiver 101a undergoes deformation under the pressure difference between the reference pressure chamber 8 and the pressure chamber 7. For example, the pressure receiver 101a bends toward the reference pressure chamber 8 when the pressure inside the pressure chamber 7 is relatively higher than the pressure inside the reference pressure chamber 8. The pressure receiver 101a bends toward the pressure chamber 7 when the pressure inside the reference pressure chamber 8 is relatively higher than the pressure inside the pressure chamber 7. The resistive changes occurring in the four strain gauges of the bridge circuit 3 as a result of deformation of the pressure receiver 101a are measured with a measurement circuit, and the pressure of the pressure chamber 7 is calculated from the measured resistive changes.

Overview of the Present Invention

An overview of the present invention is described below with reference to the accompanying drawings.

FIGS. 3A to 3D are schematic diagrams representing a traditional process of producing a diaphragm from a raw material ingot.

Figure 3A:
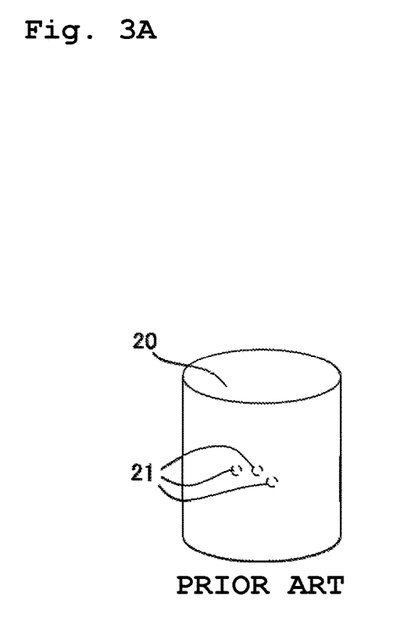
FIGS. 3A to 3D are schematic diagrams explaining the related art.
Figure 3B:
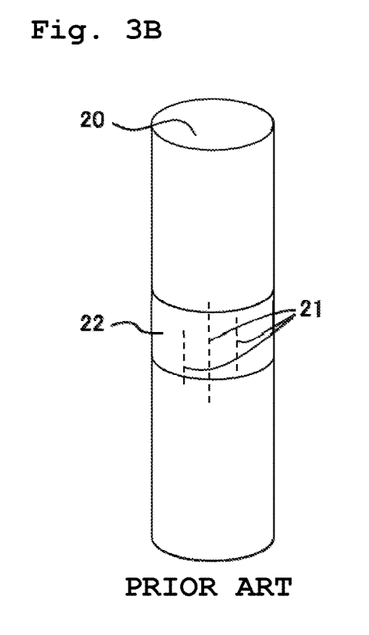
Figure 3C:
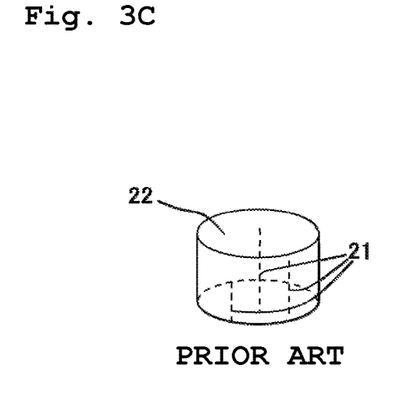
Figure 3D:
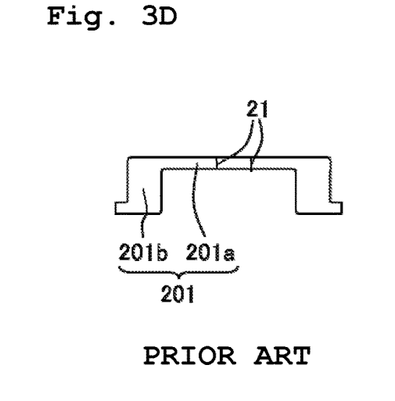

For production of a diaphragm 201 having a flat pressure receiver 201a, and a cylindrical support member 201b as shown in the cross sectional view of FIG. 3D, a raw material metal or alloy is melted to produce an ingot 20 as shown in FIG. 3A. The ingot 20 is drawn into a round rod shape as shown in FIG. 3B. The round rod is sliced into a disc-shaped block unit 22 as shown in FIG. 3C, and cut and polished to produce the diaphragm 201 as an integral unit of the pressure receiver 201a and the support member 201b.

As illustrated in FIG. 3A, pores (voids) 21 may occur inside the ingot 20 as a result of segregation. Drawing the ingot 20 elongates the metal structure in working direction. The drawing also stretches the pores 21 in working direction, as shown in FIG. 3B. If the pores 21 penetrate through the pressure receiver 201a of the diaphragm 201 as shown in FIG. 3D, gas leakage might occur between the reference pressure chamber 8 and the pressure chamber 7. Such gas leakage occurring in the diaphragm 201 used as a pressure sensor leads to an inaccurate result in pressure measurement.

The present inventors conducted intensive studies to find a solution to this problem, and found that the problem can be overcome with a metal structure of a configuration that does not allow pore penetration through the thickness direction of the pressure receiver of the diaphragm. The present invention was completed on the basis of this finding.

The present invention, with the diaphragms of the embodiments below, and a pressure sensor using the diaphragm, has enabled reducing gas leakage, and provided a diaphragm and a pressure sensor having high durability.

Embodiments of the diaphragm are described below.

First Embodiment

Figure 4:
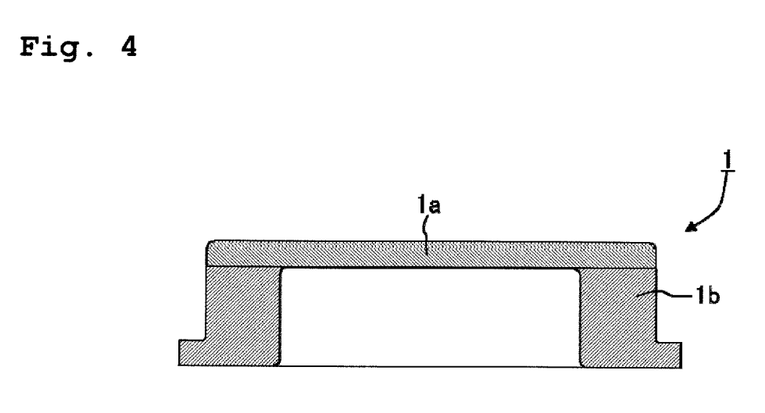
FIG. 4 is a cross sectional view of a diaphragm of First Embodiment according to the present invention.

As illustrated in FIG. 4, a diaphragm 1 of the present embodiment is constructed from a disc-shaped pressure receiver 1a, and a cylindrical support member 1b.

The support member 1b of the present embodiment may be, for example, cylindrical in shape with a height of 5 mm, an upper end outer diameter of 30 mm, an upper end inner diameter of 10 mm, a lower end outer diameter of 35 mm, and a lower end inner diameter of 10 mm. However, the support member 1b may have a range of shapes and dimensions as may be decided according to the characteristics and the use required of the pressure sensor used. As with the case of the traditional diaphragm, the support member 1b may be made by slicing a cylindrically shaped ingot in the direction orthogonal to height direction, machining the sliced ingot into a cylindrical shape, and polishing the machined product. A support member of the desired shape can be produced in this manner.

The pressure receiver 1a of the present embodiment has, for example, a form of a disc with an outer diameter of 30 mm, and a thickness of 0.1 mm. The outer diameter matches the upper end outer diameter of the support member 1b.

The pressure receiver 1a can be obtained by punching a rolled plate of a metal ingot with a round forming press. Aside from rolling, the plate may be obtained by forging. The punched circular plate is polished to obtain the pressure receiver 1a that is sufficiently flat.

Unlike the traditional process in which the plate is integrally carved out of a cylindrical block, the present embodiment enables polishing the plate, both efficiently and in a manner that improves the flatness. Further, unlike the hand polishing required for the integrally carved diaphragm from a block, the plate-shaped pressure receiver 1a of the present embodiment can be mechanically polished while in the form of a rolled plate. This is preferred as it improves the efficiency of the polishing step, and the accuracy of the pressure measurement performed with the produced pressure sensor.

Further, because the original metal ingot is flattened by rolling or forging, the metal structure is also drawn parallel to the flat plate surface, and grows parallel to the flat plate surface. Here, the pores that may have occurred in the process of melting are also drawn parallel to the flat plate surface. There accordingly will be no penetration of pores in height (thickness) direction. This makes it possible to reduce gas leakage in the produced pressure sensor.

The material of the pressure receiver 1a of the present embodiment may use a variety of metals as may be selected according to the characteristics and the intended use of the diaphragm or the pressure sensor using the pressure receiver 1a. Specifically, by using the various metallic materials described below for the pressure receiver 1a, the pressure receiver 1a can exhibit the desired mechanical characteristics and corrosion resistance suited for the desired characteristics and the intended use of the produced pressure sensor. It is preferable to use the same material for the pressure receiver and the support member, because it ensures easy bonding, and reliably prevents corrosion caused by contact between dissimilar metals.

The pressure receiver 1a and the support member 1b constituting the diaphragm 1 may be bonded to each other by using various metal bonding techniques, for example, such as resistance welding, laser welding, arc welding, ultrasonic welding, and diffusion bonding. Preferably, the bonding between the pressure receiver 1a and the support member 1b is made by diffusion bonding because it ensures that the pressure receiver 1a is sufficiently bonded to the whole upper surface of the support member 1b. Diffusion bonding is also preferred over other welding methods because it allows low temperature heating, and can reduce the poor bond strength or crevice corrosion that poses a problem when metal is welded while being melted at high temperature.

Specifically, the support member 1b and the pressure receiver 1a are brought in contact with each other, and installed in a diffusion bonding apparatus, and heat or pressure is applied in a vacuum or in an inert gas atmosphere to bond the two members with the diffused metal atoms. For example, the applied heat may be 950° C., and the applied pressure may be 30 MPa. However, the process conditions are not limited to these, and may be appropriately adjusted according to the shape and the material of the diaphragm.

Material

In the present invention, various metallic materials may be used for the diaphragm. Specifically, a wide range of corrosion resistant, durable metallic materials may be used so that the diaphragm can sufficiently exhibits its function. As specific examples, various metallic materials used for metal diaphragms may be used, including stainless steels such as austenite stainless steels, an austenite-ferrite duplex stainless steel, ferrite stainless steels, and martensite stainless steels, and alloys such as a Co—Ni-base alloy, a Ni—Mo—Cr-base alloy, and a Ni—Cr-base alloy.

Particularly, the following metallic materials can provide sufficient corrosion resistance and durability, and may preferably be used as material of the metal diaphragm.

An example of such metallic material is a Co—Ni-base alloy of a composition range containing, in mass %, Co: 28 to 42%, Ni: 15 to 40%, Cr: 10 to 27%, Mo: 3 to 12%, Ti: 0.1 to 1%, Mn: 1.5% or less, Fe: 0.1 to 26%, C: 0.1% or less, Nb: 3% or less, W: 5% or less, Al: 0.5% or less, and the balance unavoidable impurities. A Co—Ni-base alloy of such a composition has desirable mechanical characteristics, such as excellent fatigue strength against stress and repeated use, and excellent corrosion resistance against a halogen corrosiveness gas. By using the Co—Ni-base alloy for the pressure receiver, the diaphragm can provide a pressure sensor suited for pressure measurement of a corrosiveness fluid.

It is also possible to use an austenite-ferrite duplex stainless steel (SUS329J4L) of a composition range containing, in mass %, Cr: 24 to 26%, Mo: 2.5 to 3.5%, Ni: 5.5 to 7.5%, C: 0.03% or less, N: 0.08 to 0.3%, and the balance Fe and unavoidable impurities. A duplex stainless steel of such a composition has excellent electrochemical corrosion resistance against anode corrosion. Specifically, excellent corrosion resistance can be exhibited by using the duplex stainless steel for the pressure receiver of the diaphragm, even in an anode corrosive environment where an earthing device is installed in a pressure sensor incorporated in a pipe used for food and other applications.

Second Embodiment

Another embodiment of the present invention is described below with reference to the accompanying drawings.

Figure 5:
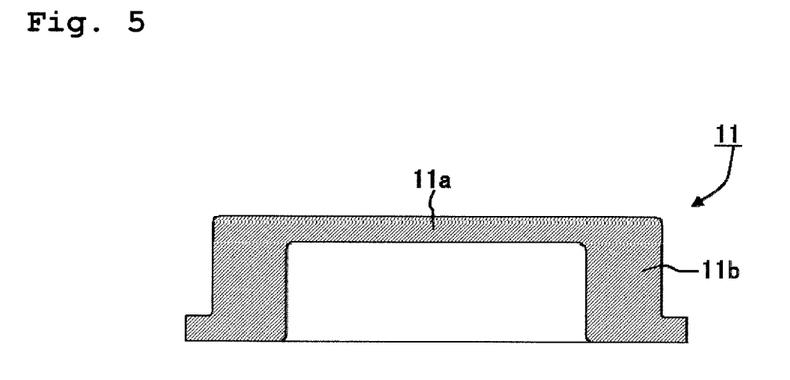
FIG. 5 is a cross sectional view of a diaphragm of Second Embodiment according to the present invention.

A diaphragm 11 shown in FIG. 5 is configured from a pressure receiver 11a, and a support member 11b. However, as in the related art, the pressure receiver 11a and the support member 11b are integrally made from a block unit by cutting and polishing.

The present embodiment differs from the related art and First Embodiment is that the diaphragm 11 is produced in the manner shown in FIGS. 6A to 6D. Specifically, the raw material ingot 20 after drawing is sliced into the block unit 22, and the block unit 22 is cut and polished after being tilted 90 degrees so that the flat plate surface of the pressure receiver 11a is oriented parallel to the longitudinal direction of original ingot 20.

Figure 6A:
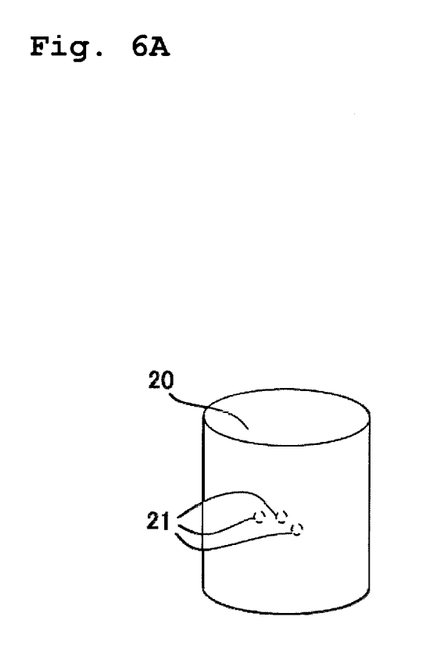
FIGS. 6A to 6D are schematic diagrams explaining the diaphragm of Second Embodiment according to the present invention.
Figure 6B:
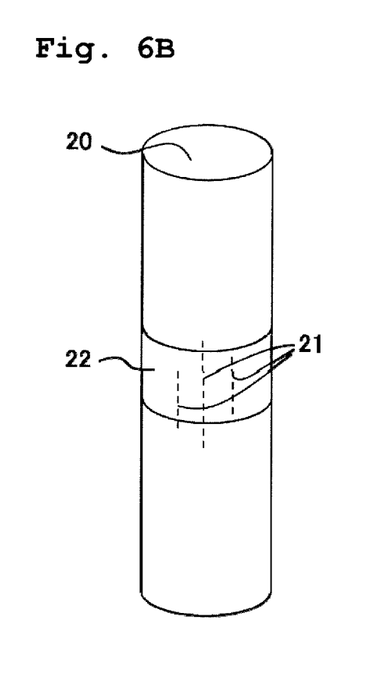
Figure 6C:
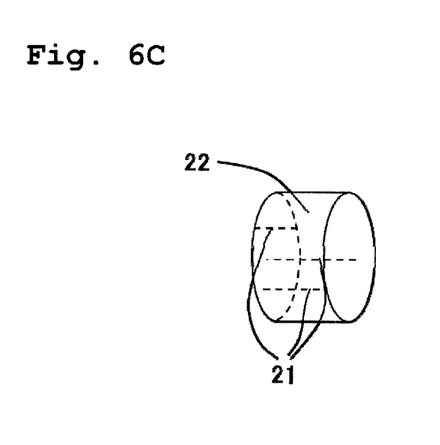

More specifically, when the ingot 20 obtained after melting a raw material metal or alloy has the pores 21 as shown in FIG. 6A, the pores 21 are drawn in working direction (longitudinal direction) after the drawing of the ingot 20, as shown in FIG. 6B. The disc-shaped block unit 22 cut out of the ingot is tilted 90 degrees as shown in FIG. 6C. Unlike the related art shown in FIGS. 3A to 3D, the pores 21 are oriented parallel to the flat plate surface. The block unit 22 oriented in this direction can then be cut and polished to produce the diaphragm 11 having the pressure receiver 11a and the support member 11b.

The metal structure in the pressure receiver 11a of the diaphragm 11 is oriented parallel to the flat plate surface, and the pores 21, when present, also occur in a direction parallel to the flat plate surface. Accordingly, the pores 21 do not penetrate through the thickness direction of the pressure receiver 11a as in First Embodiment, and gas leakage in the pressure sensor can be reduced.

In the present embodiment, the support member 11b and the pressure receiver 11a are integrally formed as in the related art, and the bonding step is not required. This is advantageous as it prevents lowering of durability or corrosion resistance due to a bonding failure.

The diaphragm 11 was described as being produced from the raw material round rod. However, the block unit may be formed from a rectangular column obtained by drawing the raw material ingot in a shape of a rectangular column. This is preferred because such a block unit can be stably mounted even when it is tilted 90 degrees.

In the present embodiment, the same materials used in First Embodiment may be used to constitute the support member 11b and the pressure receiver 11a of the diaphragm 11.

In the present embodiment, the pressure receiver 11a and the support member 11b are described as being integrally produced by cutting and polishing the block unit 22 sliced from the ingot 20. Alternatively, the block unit 22 may be forged to produce the diaphragm 11 as an integral unit of the pressure receiver 11a and the support member 11b.

Figure 6D:
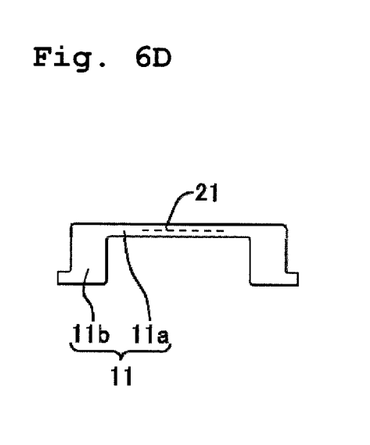

Specifically, the block unit 22 is pressed into the shape of the diaphragm 11 with a tool such as a hammer and a forming press. The forging can mechanically miniaturizes the crystal grains in the metal structure of the pressure receiver 11a, or can orient defects in the metal structure in a direction parallel to the flat plate surface. In this way, defects penetrating through the thickness direction of the pressure receiver 11a can be removed, in addition to reducing the defects themselves present in the metal structure. This makes it possible to reduce gas leakage in the pressure sensor.

What is claimed is:

1. A metallic diaphragm comprising a plate-shaped pressure receiver, and a frame-like support member,
   wherein the pressure receiver has a metal structure grown parallel to a flat plate surface of the plate-shaped pressure receiver, and
   wherein the pressure receiver comprises a Co—Ni-base alloy of a composition range containing, in mass %, Co: 28 to 42%, Ni: 15 to 40%, Cr: 10 to 27%, Mo: 3 to 12%, Ti: 0.1 to 1%, Mn: 1.5% or less, Fe: 0.1 to 26%, C: 0.1% or less, Nb: 3% or less, W: 5% or less, Al: 0.5% or less, and the balance unavoidable impurities.

2. The diaphragm according to claim 1, wherein the pressure receiver is bonded to an end surface of the support member.

3. The diaphragm according to claim 1, wherein the pressure receiver and the support member are integrally formed.

4. A pressure sensor using the diaphragm according to claim 1.

5. A method for producing a metallic diaphragm that includes a plate-shaped pressure receiver, and a frame-like support member,
   the method comprising:
   flattening a raw material alloy ingot, and punching a flattened worked plate with a forming press to produce the pressure receiver having a metal structure grown parallel to a flat plate surface of the plate; and
   bonding the pressure receiver to an end surface of the support member,
   wherein the pressure receiver comprises a Co—Ni-base alloy of a composition range containing, in mass %, Co: 28 to 42%, Ni: 15 to 40%, Cr: 10 to 27%, Mo: 3 to 12%, Ti: 0.1 to 1%, Mn: 1.5% or less, Fe: 0.1 to 26%, C: 0.1% or less, Nb: 3% or less, W: 5% or less, Al: 0.5% or less, and the balance unavoidable impurities.

6. The method according to claim 5, wherein the pressure receiver and the end surface of the support member are bonded to each other by diffusion bonding.

7. A method for producing a metallic diaphragm that includes a plate-shaped pressure receiver, and a frame-like support member,
   the method comprising:
   cold working a raw material alloy ingot into a rod shape to produce a rod body having a metal structure extending along the working direction;
   cutting the rod body into a desired size to obtain a block unit, and machining the block unit to integrally form the pressure receiver and the support member in such an orientation that the growth direction of the metal structure is parallel to a flat plate surface of the plate-shaped pressure receiver.

8. The method according to claim 7, wherein the pressure receiver comprises a Co—Ni-base alloy of a composition range containing, in mass %, Co: 28 to 42%, Ni: 15 to 40%, Cr: 10 to 27%, Mo: 3 to 12%, Ti: 0.1 to 1%, Mn: 1.5% or less, Fe: 0.1 to 26%, C: 0.1% or less, Nb: 3% or less, W: 5% or less, Al: 0.5% or less, and the balance unavoidable impurities.

9. The method according to claim 7, wherein the pressure receiver comprises a duplex stainless steel of a composition range containing, in mass %, Cr: 24 to 26%, Mo: 2.5 to 3.5%, Ni: 5.5 to 7.5%, C: 0.03% or less, N: 0.08 to 0.3%, and the balance Fe and unavoidable impurities.

* * * * *